United States Patent [19]

Yamamoto

[11] Patent Number: 4,983,016
[45] Date of Patent: Jan. 8, 1991

[54] TRANSMISSION PROJECTION SCREEN AND METHOD OF MANUFACTURING THE SAME

[75] Inventor: Yoshiharu Yamamoto, Osaka, Japan

[73] Assignee: Matsushita Electric Industrial Co., Ltd., Osaka, Japan

[21] Appl. No.: 471,612

[22] Filed: Jan. 29, 1990

[30] Foreign Application Priority Data

Jan. 30, 1989 [JP] Japan ................. 64-20004

[51] Int. Cl.⁵ .......................................... G03B 21/60
[52] U.S. Cl. ................................................ 350/126
[58] Field of Search ............... 264/1.1, 1.3, 1.7, 2.7; 350/117, 126; 358/231

[56] References Cited

U.S. PATENT DOCUMENTS

| | | | |
|---|---|---|---|
| 2,584,441 | 2/1952 | Fredendall | 350/126 |
| 3,437,405 | 4/1969 | Northrop | 350/126 X |
| 3,679,451 | 7/1972 | Marks et al. | 350/126 X |
| 3,751,135 | 8/1973 | Clausen et al. | 350/126 X |
| 4,066,332 | 1/1978 | Kato et al. | 350/126 |
| 4,140,369 | 2/1979 | Howland | 350/126 |
| 4,165,153 | 8/1979 | Land | 350/126 |
| 4,174,883 | 11/1979 | Imataki et al. | 350/126 |
| 4,566,756 | 1/1986 | Heijnemans | 350/126 |
| 4,707,746 | 11/1987 | Nishikawa | 358/231 |

FOREIGN PATENT DOCUMENTS

| | | |
|---|---|---|
| 1487779 | 5/1975 | Fed. Rep. of Germany . |
| 59-135450 | 8/1984 | Japan . |
| 63-163445 | 7/1988 | Japan . |
| 63-291001 | 11/1988 | Japan . |
| 63-291002 | 11/1988 | Japan . |
| 540567 | 10/1941 | United Kingdom . |

OTHER PUBLICATIONS

Optik, vol. 3, 1966, p. 378.

*Primary Examiner*—Richard A. Wintercorn
*Attorney, Agent, or Firm*—Wenderoth, Lind & Ponack

[57] ABSTRACT

A screen is made having the same characteristics as of a known lenticular lens by having a number of organic materials provided in scatter arrangement within a substrate of a screen and shaped into bar-like configuration by stretching for the purpose of anisotropic diffusion of light.

16 Claims, 3 Drawing Sheets

TRANSMISSION PROJECTION SCREEN AND METHOD OF MANUFACTURING THE SAME

BACKGROUND OF THE INVENTION

1. Field of the Invention

The present invention relates to a high quality transmission projection screen for use with a transmitting type (rear-view) projection television.

2. Description of the Prior Art

It is essential for a transmission projection screen employed as the viewing screen of a rear-projection television to have a wider viewing angle and provide a projected image of high resolution and brightness. Such a transmission projection screen has a substrate containing a mixture of light diffusing medium for rendering the projected light visible. The transmission projection screen also incorporates a lenticular lens(es) provided on the surface thereof for anisotropic diffusion of the projected light while enhancing the luminance of an image throughout the viewing angle. Additionally, a Fresnel lens which serves as a field lens to the flux of projected light, is used in combination with the projection screen for minimizing decline in the luminance at the edge region of the projection screen.

For enhancement of the resolution of the transmission projection screen, it is practical to have the substrate section of the same, which contains the light diffusing medium for rendering the projected light visible, reduced in the thickness and allow the lenticular lens provided on the surface to reduce in the lens pitch. A method of thinning the substrate section containing light diffusing medium is disclosed in Japanese Patent Laid-open Publication No. 63-273850 (1988) in which a thin film of substrate is formed from a mixture of light diffusing medium and resin and attached to the surface of a transmission projection screen. However, it is still difficult in practice to have a lenticular lens of narrower lens pitch adapted for anisotropic diffusion of the projected light to provide high resolution. For example, it becomes remarkably intricate to fabricate forming molds of providing a lenticular lens on the surface of the transmission projection screen. Also, the useable life of such complex forming molds is hardly extended in the relation to forming shots, which causes the overall cost to increase.

A known transmitting type projection television is generally arranged in which an image developed on the phosphor screen of a cathode ray tube is projected through a projection lens onto a large-size transmission projection screen. It is also known that liquid crystal panels are used as light valves to constitute a projector in a transmitting type projection television. More particularly, when patterns of image information are developed on the liquid crystal panels by means of variation in the transmittance according to image signals, the light incident on the back of the liquid crystal panels is modulated to produce a visual image on the transmission projection screen through projection by a projection lens. In this method, each of the liquid crystal panels comprises a plurality of very small light valve elements provided in a matrix arrangement and thus, an image projected through the projection lens onto the transmission projection screen is constituted by a corresponding matrix form of pixels. The interaction between the pixel matrix and the lenticular lens of the transmission projection screen will cause Moire effects, thus lowering picture quality. It is also necessary for visual effect that the pitch of the lenticular lens of the transmission projection screen is considerably narrowed so as to ensure no decline in the picture quality. Similarly as described previously, it becomes troublesome to fabricate forming molds of providing such a narrow-pitch lenticular lens on the surface of the transmission projection screen. Also, the life of the forming molds cannot be kept long as the number of forming shots increases. As a result, the production cost will rise.

SUMMARY OF THE INVENTION

Accordingly, a primary object of the present invention is to provide an improved transmission projection screen for a transmitting type projection television which allows no Moire effect to result from the optical interaction between a Fresnel lens and a lenticular lens or from the interaction between the pitch of a matrix pattern of pixels formed on the transmission projection screen and the pitch of a lenticular lens of the transmission projection screen while ensuring high resolution and also, of which production is facilitated.

To accomplish the foregoing object of the present invention, an arrangement is made in which a substrate of a light transmissible resin material constituting a transmission projection screen contains a plurality of bar-like members of another resin material different in refractive index from and not soluble in the light transmissible resin material, the bar-like resin members being dispersed and orientated in the same direction.

In practice, the projected light to the transmission projection screen is thus distributed in anisotropic relationship by the bar-like resin members having a different index of refraction from that of the light transmissible resin material and arranged in the same direction within the substrate of light transmissible resin material constituting the transmission projection screen. At the same time, the projected light is diffused by the bar-like resin members of very small diameter. As the result, a picture of high resolution can be obtained. Since the bar-like resin members are respectively bound at random intervals with the light transmissible resin material or in the substrate of the transmission projection screen, the transmission projection screen with a Fresnel lens produces no visual annoyance of Moire effect. Similarly, in a transmitting type projection television employing liquid crystal panels as light valves, no Moire pattern will appear on the transmission projection screen.

In production of the transmission projection screen, the bar-like members of resin material which is different in the refractive index from and not soluble in the light transmissible resin material, can be dispersed in the same orientation within the light transmissible resin material by embedding a large number of beads of extensible resin material different in the refractive index from and not soluble in the light transmissible resin material into a light transmissible resin substrate which is in turn shaped into a sheet form and stretching out the resin sheet in one direction to shape each resin bead into a bar-like form. The bar-like resin members which are bound at intervals with the light transmissible resin material, are preferably transparent. If the degree of transparency is low, the absorption of light increases, and hence, the transmission projection screen is declined in the functional efficiency, thus reducing the screen gain and failing to reproduce a luminous picture.

As set forth above, the transmission projection screen according to the present invention ensures the reproduction of a high resolution image and thereby, makes it possible to develop an advanced transmitting type projection television for reproduction of a higher quality picture, promoting the application to industrial uses.

DESCRIPTION OF THE PREFERRED EMBODIMENT

A preferred embodiment of the present invention will be described in detail referring to the accompanying drawings.

Figure 1:
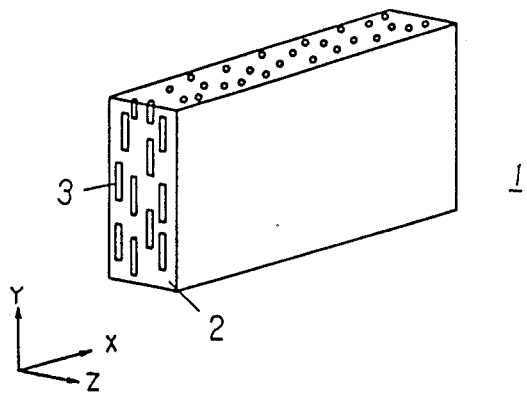
FIG. 1 is a perspective view of a transmission projection screen according to the present invention.
Figure 2:
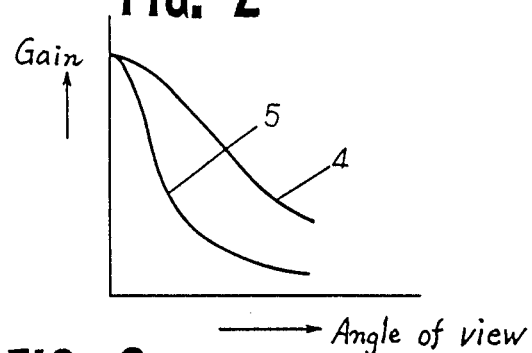
FIG. 2 is a diagram showing the characteristics of gain relative to a viewing angle on the transmission projection screen.

FIG. 1 is a perspective view of a transmission projection screen according to the present invention. The transmission projection screen 1 of the present invention consists of a substrate of light transmissible resin material 2 which contains a plurality of bar-like resin members 3 having a different index of refraction from that of the light transmissible resin material 2 and respectively arranged therein to direct in the same lengthwise direction. Accordingly, light projected onto the transmission projection screen 1 is diffused by the bar-like resin members 3, as also shown in FIG. 1, from the Z-axis in the X-axis direction rather than the Y-axis direction. This is expressed in FIG. 2 as the relation between gain and viewing angle on the transmission projection screen of the present invention in which the curve 4 represents gain characteristics when the viewing angle is extended from the Z-axis in the X-axis direction and the curve 5 in the Y-axis direction. As apparent from FIG. 2, the transmission projection screen according to the present invention can provide the same effect as the anisotropic distribution of light by a known lenticular lens. Also, its functional arrangement for anisotropic distribution of light can easily be made compact in size, thereby making it possible to produce a high resolution transmission projection screen.

Figure 3:
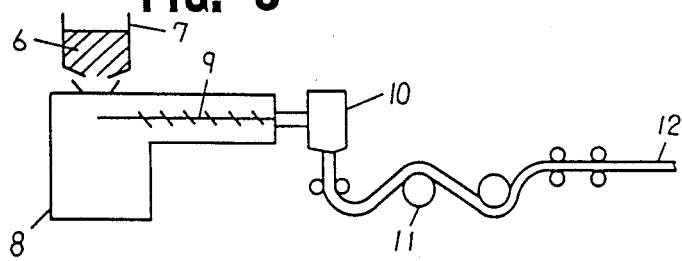
FIGS. 3 and 4 are schematic views showing the process of manufacturing a transmission projection screen according to the present invention.
Figure 4:
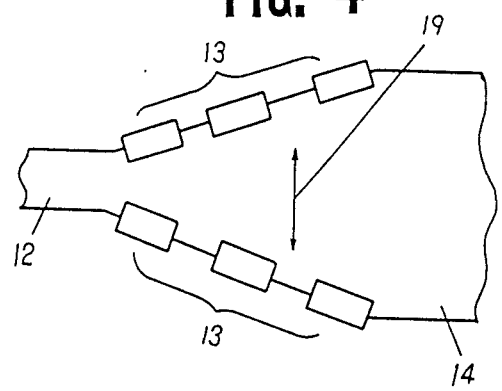

FIGS. 3 and 4 illustrate a method of manufacturing such an improved transmission projection screen according to the present invention in which a resin mixture 6 produced by mixing a light transmissible resin material of transparent thermoplastic property with beads of another resin material different in refractive index from and not soluble in the light transmissible resin material, is infed from a hopper 7 to an extruder machine 8 and after molten by heat, transferred under pressure with a screw 9 to a dice 10. The resin mixture 6 is then flattened into a planar shape by the dice 10 and arranged to a predetermined width and thickness between a plurality of forming rolls 11 thermally controlled by a thermal regulator (not shown) in order to form a sheet 12. In the sheet 12 of resin mixture, the resin beads which are different in the refractive index from and not soluble in the light transmissible resin remain in the same spherical shape as before the process. Then, the sheet 12 is gripped with a plurality of clips 13 and stretched out by tension in the directions represented by the arrow 19. As the resin mixture is further shaped into a stretched sheet 14, the resin beads different in the refractive index from and not soluble in the light transmissible resin material turn into bar-like members. The stretched sheet 14 is processed by a masking procedure to prevent surface injury and keep from impurities such as dirt and finally, cut to a given size to form a desired transmission projection screen.

It would be understood that the light transmissible resin material and the resin material of beads do not solve in each other in a heat molten condition so that each of the resin beads mixed with the light transmissible resin material which has a different index of refraction from that of the resin beads, can be formed into the bar-like shape by stretching out a mixture sheet of the light transmissible resin material and the resin beads in one direction. It is also required that the refractive index is different between both the resin materials. From the result of an experiment by the inventor, it was found that the application of light remained efficient when such a difference of refractive index was, at the most, not more than 0.15 at the d line of 587.6 nm wavelength. More particularly, if the difference in the refractive index is greater than 0.15, reflection or total reflection of light occurs on the boundary surface between the two resin materials and thus, the transmittance of light or the efficiency of use of light will be decreased lowering the brightness of a reproduced image. To satisfy the foregoing requirements, the light transmissible resin material may be acrylic resin, polycarbonate resin, polyester resin, polyvinyle chloride resin, etc. The acrylic resin is most preferred in the form of a polymer consisting mainly of alkyl methacrylate such as methyl methacrylate, ethyl methacrylate, butyl methacrylate, propyl methacrylate, or the like. The resin bead is preferably of transparent silicone resin or allyl resin such as allyl methacrylane. Particularly, when the light transmissible resin material is acrylic resin, beads of denatured acryl resin with a high degree of refraction, polystyrene resin, or polycarbonate resin will be most desirable. With the complementary use of other light diffusing medium, e.g. organic or inorganic ultrafine particles of $SiO_2$, $Al_2O_3$, $CaCO_3$, or $Al(OH)_3$, which is added to and commingled with the light transmissible resin material for enhancement of the diffusion of light, the flexibility in designing an improved transmission projection screen will be increased.

Figure 5:
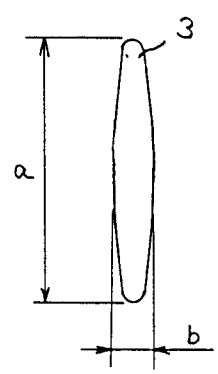
FIG. 5 is a cross sectional view describing the shape of bar-like resin members 3 arranged in separate rows within a light transmissible resin material of the transmission projection screen.

FIG. 5 illustrates the external shape of the bar-like resin member 3, the plurality of which are dispersed within the light transmissible resin substrate of the transmission projection screen according to the present invention. The ratio of a lengthwise extent a and a widthwise extent b of the bar-like resin member 3 is determined according to the characteristics of light distribution of a desired transmission projection screen. In an experiment, the result was acceptable when the ratio (a:b) is greater than 3:1.

Figure 6:
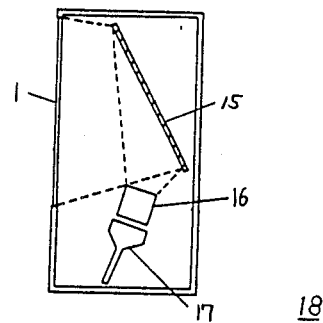
FIG. 6 is a schematic cross sectional view showing the arrangement of a transmitting type CRT projection television employing a transmission projection screen of the present invention.

FIG. 6 is a cross sectional view of a transmitting type projection television 18 provided with the transmission projection screen 1 of the present invention, in which an optical image developed on a CRT 17 is projected through a projection lens 16 and a reflector mirror 15 onto the transmission projection screen 1. In the transmission projection screen of the present invention, the substrate of light transmissible resin material contains the plurality of bar-like resin members having a different index of refraction from that of the light transmissible resin substrate and dispersed in the same orientation for the control of a viewing angle and thus, can allow the same functional elements as of a known lenticular lens to be arranged with much higher precision.

Figure 7:
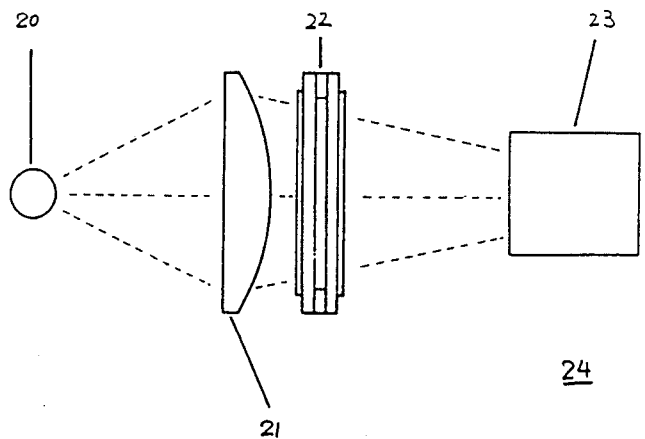
FIG. 7 is a schematic view showing a projector for a transmitting type projection television in which liquid crystal panels are used as light valves.

FIG. 7 is a schematic view showing an arrangement of a projector 24 for a transmitting type projection television employing liquid crystal panels as light valves, in which a liquid crystal panel 22 which produces an image corresponding to variations in the transmittance of light responsive to signals of image information, is illuminated from the back by an optical illumination system comprising a lamp 20 and a light condenser lens 21. The light passed across the liquid crystal panel 22 is thrown through a projection lens 23 to form an enlarged image on the projection screen as a focus plane.

Figure 8:
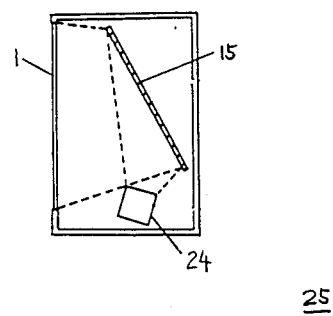
FIG. 8 is a schematic cross sectional view showing the arrangement of a transmitting type projection television employing a transmission projection screen of the present invention and the projector including liquid crystal panels used as light valves.

FIG. 8 is a cross sectional view showing a schematic arrangement of a transmitting type projection television equipped with the transmission projection screen 1 of the present invention and the foregoing projector 24 employing liquid crystal panels as light valves. The projected light from the projector 24 is reflected on a reflector mirror 15 and thrown to yield an optical image on the transmission projection screen 1. In the transmission projection screen 1 of the present invention, the substrate of light transmissible resin material contains a plurality of bar-like resin members which are different in the refractive index from the light transmissible resin substrate, arranged in the same direction, and specifically, spaced at random intervals from each other for the control of a viewing angle and thus, can allow no Moire effect to appear resulting from the interaction between the bar-like members dispersed in the transmission projection screen and the pattern of pixels on the transmission projection screen corresponding to the matrix arrangement on the liquid crystal panel, ensuring the reproduction of a picture without decline in the picture quality.

What is claimed is:

1. A transmission projection screen comprising a light transmissible resin material and a plurality of bar-like members of another resin material which is different in index of refraction from and not soluble in said light transmissible resin material, the bar-like members being dispersed in the light transmissible resin material and directing in a same direction.

2. A transmission projection screen according to claim 1, wherein a difference of refractive index relative to the d line between said light transmissive resin material and said bar-like resin material is at most 0.15.

3. A transmission projection screen according to claim 1, wherein a lengthwise extent a and a widthwise extent b of each of said bar-like resin members is expressed as:

$a/b \geq 3$.

4. A transmission projection screen according to claim 1, wherein said light transmissible resin material comprises a transparent thermoplastic resin.

5. A method of manufacturing a transmission projection screen of claim 1, comprising the steps of forming into a sheet said light transmissible resin material in which extensible beads of said resin material insoluble in and different in the refractive index from said light transmissible resin material are held in scatter arrangement, and stretching out said sheet of resin in one direction so as to shape each of said resin beads into a bar-like form.

6. A method of manufacturing a transmission projection screen according to claim 5, wherein said light transmissible resin material comprises an acrylic resin.

7. A method of manufacturing a transmission projection screen according to claim 5, wherein said light transmissible resin material comprises a polycarbonate resin.

8. A method of manufacturing a transmission projection screen according to claim 5, wherein said light transmissible resin material comprises a polyester resin.

9. A method of manufacturing a transmission projection screen according to claim 5, wherein said light transmissible resin material comprises a polyvinyl chloride resin.

10. A method of manufacturing a transmission projection screen according to claim 5, wherein each of said resin beads comprises a transparent silicone resin.

11. A method of manufacturing a transmission projection screen according to claim 5, wherein each of said resin beads comprises an aryl resin.

12. A method of manufacturing a transmission projection screen according to claim 6, wherein each of said resin beads comprises a denatured acrylic resin having a high degree of refractive index.

13. A method of manufacturing a transmission projection screen according to claim 6, wherein each of said resin beads comprises a polystyrene resin.

14. A method of manufacturing a transmission projection screen according to claim 6, wherein each of said resin beads comprises a polycarbonate resin.

15. A transmitting type projection television comprising:
a transmission projection screen comprising a light transmissible resin material in which a plurality of bar-like members of another resin material having a different index of refraction from and not soluble in said light transmissible resin material are dispersed to be same in orientation direction;
a cathode ray tube; and
a projection lens for projecting of an optical image developed on said cathode ray tube onto said transmission projection screen.

16. A transmitting type projection television comprising:
a transmission projection screen comprising a light transmissible resin material in which a plurality of bar-like members of another resin material having a different index of refraction from and not soluble in said light transmissible resin material are dispersed to be same in orientation direction;
a liquid crystal panel;
an optical illumination system for illuminating an image developed on said liquid crystal panel to form an image on the liquid crystal panel; and
a projection lens for projecting the image formed on the liquid crystal panel onto said projection screen.

* * * * *